United States Patent
Kraus et al.

(10) Patent No.: US 10,836,221 B2
(45) Date of Patent: Nov. 17, 2020

(54) ELECTRONIC WHEEL UNIT AND CONTROL DEVICE FOR A WHEEL-MONITORING SYSTEM OF A VEHICLE, WHEEL-MONITORING SYSTEM FOR A VEHICLE AND METHOD FOR MONITORING WHEELS IN A VEHICLE

(71) Applicant: CONTINENTAL AUTOMOTIVE GMBH, Hannover (DE)

(72) Inventors: Johannes Kraus, Nittendorf (DE); Thomas Haas, Donaustauf (DE); Christian Brueckl, Bernhardswald (DE); Marc-Michael Pflugmann, Rain (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/471,130

(22) PCT Filed: Dec. 13, 2017

(86) PCT No.: PCT/EP2017/082612
§ 371 (c)(1),
(2) Date: Jun. 19, 2019

(87) PCT Pub. No.: WO2018/114524
PCT Pub. Date: Jun. 28, 2018

(65) Prior Publication Data
US 2019/0329607 A1    Oct. 31, 2019

(30) Foreign Application Priority Data
Dec. 19, 2016    (DE) .................. 10 2016 225 496

(51) Int. Cl.
*B60C 23/04*    (2006.01)

(52) U.S. Cl.
CPC ...... *B60C 23/0471* (2013.01); *B60C 23/0442* (2013.01); *B60C 23/0462* (2013.01)

(58) Field of Classification Search
None
See application file for complete search history.

(56) References Cited

U.S. PATENT DOCUMENTS 5,569,848 A * 10/1996 Sharp .................... B60C 23/061
                                                              73/146.2
5,602,524 A *  2/1997 Mock .................. B60C 23/0442
                                                              340/447

(Continued)

FOREIGN PATENT DOCUMENTS

| CN | 100507966 C | 7/2009 |
|----|-------------|--------|
| CN | 101687447 A | 3/2010 |

(Continued)

*Primary Examiner* — Curtis J King
(74) *Attorney, Agent, or Firm* — Laurence A. Greenberg; Werner H. Stemer; Ralph E. Locher

(57) ABSTRACT

An electronic wheel unit for a wheel-monitoring system of a vehicle is disposed on one of the wheels and is configured to detect at least one wheel operating parameter of the wheel and to transmit wheel operating data telegrams according to a data transmission protocol wirelessly to a control device, configured to receive and evaluate the wheel operating data telegrams. The electronic control unit defines the data transmission protocol, which is to be used to transmit the wheel operating data telegrams, by using specification data which have previously been transmitted from the control device to the electronic wheel unit. Therefore, automatic adaptation of the data transmission protocol to the respective control device or the respective vehicle can advantageously take place. A control device for such a wheel monitoring system and a system and a method for monitoring wheels are also provided.

18 Claims, 3 Drawing Sheets

(56) References Cited

U.S. PATENT DOCUMENTS

| | | | | |
|---|---|---|---|---|
| 6,062,072 A * | 5/2000 | Mock | ............ | H01Q 1/2241 |
| | | | | 73/146.5 |
| 6,838,985 B2 * | 1/2005 | Ghabra | ............ | B60C 23/0416 |
| | | | | 340/442 |
| 7,015,801 B1 * | 3/2006 | Juzswik | ............ | B60C 23/0408 |
| | | | | 340/10.1 |
| 7,091,840 B2 * | 8/2006 | Ichinose | ............ | B60C 23/0408 |
| | | | | 152/152.1 |
| 7,202,777 B2 * | 4/2007 | Tsuji | ............ | B60C 23/0464 |
| | | | | 340/445 |
| 7,363,806 B2 * | 4/2008 | Huang | ............ | B60C 23/0433 |
| | | | | 73/146 |
| 7,487,671 B1 * | 2/2009 | Zhu | ............ | B60C 23/0416 |
| | | | | 73/146.5 |
| 7,508,301 B2 * | 3/2009 | Christenson | ............ | B60C 23/0416 |
| | | | | 116/34 R |
| 7,791,460 B2 | 9/2010 | Watabe | | |
| 8,659,412 B2 | 2/2014 | Deniau | | |
| 8,692,661 B2 | 4/2014 | Deniau et al. | | |
| 9,446,634 B2 | 9/2016 | Wagner et al. | | |
| 9,446,635 B2 | 9/2016 | Wagner et al. | | |
| 9,475,349 B1 * | 10/2016 | Ushida | ............ | B60C 23/0435 |
| 10,206,231 B1 | 2/2019 | Kandler | ............ | H04B 1/3822 |
| 10,245,904 B1 | 4/2019 | Van Wiemeersch | ............ | |
| | | | | B60C 23/0464 |
| 2002/0084896 A1 * | 7/2002 | Dixit | ............ | B60C 23/0416 |
| | | | | 340/447 |
| 2002/0177406 A1 * | 11/2002 | O'Connor | ............ | H04L 27/0008 |
| | | | | 455/39 |
| 2003/0122660 A1 * | 7/2003 | Kachouh | ............ | B60C 23/0462 |
| | | | | 340/442 |
| 2003/0156021 A1 * | 8/2003 | Tabata | ............ | B60C 23/0416 |
| | | | | 340/442 |
| 2003/0179086 A1 * | 9/2003 | Nantz | ............ | B60C 23/0416 |
| | | | | 340/445 |
| 2003/0197603 A1 * | 10/2003 | Stewart | ............ | B60C 23/0416 |
| | | | | 340/442 |
| 2004/0004556 A1 * | 1/2004 | Desai | ............ | B60C 23/0462 |
| | | | | 340/870.07 |
| 2004/0046651 A1 * | 3/2004 | Norimatsu | ............ | B60C 23/0445 |
| | | | | 340/445 |
| 2004/0056764 A1 * | 3/2004 | Kusunoki | ............ | B60C 23/0408 |
| | | | | 340/442 |
| 2004/0061602 A1 * | 4/2004 | Taguchi | ............ | B60C 23/0408 |
| | | | | 340/447 |
| 2004/0189457 A1 * | 9/2004 | Watabe | ............ | B60C 23/0442 |
| | | | | 340/445 |
| 2005/0071057 A1 * | 3/2005 | Lin | ............ | B60C 23/0413 |
| | | | | 701/29.6 |
| 2005/0102073 A1 * | 5/2005 | Ingram, II | ............ | B60C 23/003 |
| | | | | 701/31.4 |
| 2005/0109094 A1 * | 5/2005 | Umegaki | ............ | B60C 23/0416 |
| | | | | 73/146 |
| 2005/0132791 A1 * | 6/2005 | Hayashi | ............ | B60C 23/0408 |
| | | | | 73/146 |
| 2005/0134445 A1 * | 6/2005 | Ogawa | ............ | B60C 23/0462 |
| | | | | 340/447 |
| 2005/0150285 A1 * | 7/2005 | Lin | ............ | B60C 23/0408 |
| | | | | 73/146.5 |
| 2005/0156723 A1 * | 7/2005 | Fujii | ............ | B60C 23/0408 |
| | | | | 340/447 |
| 2005/0163063 A1 | 7/2005 | Kuchler et al. | | |
| 2005/0174225 A1 * | 8/2005 | Kuchler | ............ | B60C 23/041 |
| | | | | 340/445 |
| 2005/0190049 A1 * | 9/2005 | Kuchler | ............ | B60C 23/0408 |
| | | | | 340/445 |
| 2005/0248446 A1 * | 11/2005 | Watabe | ............ | B60C 23/0489 |
| | | | | 340/442 |
| 2005/0285727 A1 * | 12/2005 | Watabe | ............ | B60C 23/0408 |
| | | | | 340/445 |
| 2006/0139158 A1 * | 6/2006 | Miller | ............ | B60C 23/0408 |
| | | | | 340/445 |
| 2006/0238324 A1 | 10/2006 | Kachouh et al. | | |
| 2006/0259214 A1 * | 11/2006 | McQuade | ............ | B60C 23/0413 |
| | | | | 340/445 |
| 2007/0090970 A1 * | 4/2007 | Watabe | ............ | B60C 23/0462 |
| | | | | 340/901 |
| 2007/0279203 A1 * | 12/2007 | Thomas | ............ | B60C 23/068 |
| | | | | 340/447 |
| 2008/0018444 A1 * | 1/2008 | Brown | ............ | B60C 23/0401 |
| | | | | 340/442 |
| 2008/0094197 A1 | 4/2008 | Huang | | |
| 2008/0094198 A1 * | 4/2008 | Yu | ............ | B60C 23/0408 |
| | | | | 340/447 |
| 2008/0150711 A1 * | 6/2008 | Mori | ............ | B60C 23/0442 |
| | | | | 340/445 |
| 2008/0157950 A1 * | 7/2008 | Mori | ............ | B60C 23/0444 |
| | | | | 340/438 |
| 2008/0178667 A1 * | 7/2008 | Kusunoki | ............ | B60C 23/0408 |
| | | | | 73/146.4 |
| 2008/0191855 A1 * | 8/2008 | Fink | ............ | B60C 23/0416 |
| | | | | 340/447 |
| 2008/0205553 A1 * | 8/2008 | Costello | ............ | B60C 23/0408 |
| | | | | 375/316 |
| 2008/0291002 A1 * | 11/2008 | Katou | ............ | B60C 23/044 |
| | | | | 340/442 |
| 2009/0015393 A1 * | 1/2009 | Mori | ............ | B60C 23/0442 |
| | | | | 340/445 |
| 2009/0024272 A1 | 1/2009 | Rogers et al. | | |
| 2009/0058626 A1 * | 3/2009 | Watabe | ............ | B60C 23/0442 |
| | | | | 340/447 |
| 2009/0121858 A1 | 5/2009 | Desai et al. | | |
| 2009/0224901 A1 | 9/2009 | Yu | | |
| 2010/0033316 A1 | 2/2010 | Oda | | |
| 2010/0052886 A1 * | 3/2010 | Kessler | ............ | B60C 23/0416 |
| | | | | 340/447 |
| 2010/0066524 A1 * | 3/2010 | Yu | ............ | B60C 23/0472 |
| | | | | 340/447 |
| 2010/0073157 A1 * | 3/2010 | Maehara | ............ | B60C 23/0416 |
| | | | | 340/447 |
| 2010/0225464 A1 | 9/2010 | Oda | | |
| 2011/0153120 A1 * | 6/2011 | Katou | ............ | B60C 23/0408 |
| | | | | 701/2 |
| 2011/0304454 A1 * | 12/2011 | Lickfelt | ............ | B60C 23/0418 |
| | | | | 340/447 |
| 2011/0313623 A1 * | 12/2011 | Greer | ............ | G06F 11/30 |
| | | | | 701/49 |
| 2012/0013458 A1 * | 1/2012 | Kanenari | ............ | B60C 23/0471 |
| | | | | 340/447 |
| 2012/0262285 A1 * | 10/2012 | Ho | ............ | B60C 23/0455 |
| | | | | 340/442 |
| 2012/0262286 A1 * | 10/2012 | Ho | ............ | B60C 23/0455 |
| | | | | 340/442 |
| 2014/0002258 A1 * | 1/2014 | Chen | ............ | B60C 23/0455 |
| | | | | 340/447 |
| 2014/0210606 A1 * | 7/2014 | Katiba | ............ | B60C 23/0415 |
| | | | | 340/442 |
| 2014/0266661 A1 * | 9/2014 | Deniau | ............ | B60C 23/0471 |
| | | | | 340/445 |
| 2014/0306815 A1 * | 10/2014 | Henriet | ............ | B60C 23/0455 |
| | | | | 340/447 |
| 2014/0368325 A1 * | 12/2014 | Yu | ............ | B60C 23/0461 |
| | | | | 340/442 |
| 2015/0015389 A1 | 1/2015 | McIntyre et al. | | |
| 2015/0015390 A1 * | 1/2015 | McIntyre | ............ | B60C 23/0471 |
| | | | | 340/447 |
| 2015/0042464 A1 | 2/2015 | Yu et al. | | |
| 2015/0237627 A1 * | 8/2015 | Deniau | ............ | H04W 72/0453 |
| | | | | 375/303 |
| 2015/0239304 A1 * | 8/2015 | Deniau | ............ | B60C 23/0442 |
| | | | | 340/442 |
| 2015/0239305 A1 * | 8/2015 | Deniau | ............ | B60C 23/0479 |
| | | | | 340/442 |
| 2016/0059647 A1 * | 3/2016 | Deniau | ............ | B60C 23/0445 |
| | | | | 340/447 |
| 2016/0229236 A1 * | 8/2016 | Taki | ............ | B60C 23/0488 |

(56) References Cited

U.S. PATENT DOCUMENTS

2017/0203619 A1* 7/2017 Gow ................... B60C 23/0416
2019/0118589 A1* 4/2019 Patel .................. B60C 23/0457
2019/0230615 A1* 7/2019 Werner ............... B60C 23/0488

FOREIGN PATENT DOCUMENTS

| | | | |
|---|---|---|---|
| CN | 102092247 | A | 6/2011 |
| CN | 102862450 | A | 1/2013 |
| CN | 103587357 | A | 2/2014 |
| CN | 103640442 | A | 3/2014 |
| CN | 105365502 | A | 3/2016 |
| DE | 102014111968 | A1 | 2/2016 |
| EP | 2722201 | A1 | 4/2014 |
| EP | 2982523 | A1 | 2/2016 |
| GB | 2500697 | A | 10/2013 |
| GB | 2532151 | A | 5/2016 |
| WO | 2015009595 | A1 | 1/2015 |

* cited by examiner

ELECTRONIC WHEEL UNIT AND CONTROL DEVICE FOR A WHEEL-MONITORING SYSTEM OF A VEHICLE, WHEEL-MONITORING SYSTEM FOR A VEHICLE AND METHOD FOR MONITORING WHEELS IN A VEHICLE

BACKGROUND OF THE INVENTION

Field of the Invention

The present invention relates to an electronic wheel unit for a wheel-monitoring system of a vehicle which is equipped with vehicle wheels, wherein the electronic wheel unit is designed to detect, while being arranged on one of the vehicle wheels, at least one wheel operating parameter of the vehicle wheel and to transmit corresponding wheel operating data telegrams by radio to a control device of the vehicle according to a data transmission protocol, which control device is designed to receive and evaluate the wheel operating data telegrams.

In addition, the present invention relates to a control device for a wheel monitoring system of a vehicle which is equipped with vehicle wheels, wherein at least one of the vehicle wheels is equipped with an electronic wheel unit, arranged thereon, for detecting at least one wheel operating parameter of the respective vehicle wheel and for transmitting corresponding wheel operating data telegrams by radio to the control device according to a data transmission protocol, wherein the control device is designed to receive and evaluate the wheel operating data telegrams.

In addition, the present invention relates to a wheel monitoring system and to a method for monitoring wheels in a vehicle which is equipped with vehicle wheels, wherein on at least one of the vehicle wheels at least one wheel operating parameter of the vehicle wheel is detected by means of an electronic wheel unit arranged on the vehicle wheel and corresponding wheel operating data telegrams are transmitted by radio by means of the electronic wheel unit to a control device of the vehicle according to a data transmission protocol, which control device is designed to receive and evaluate the wheel operating data telegrams.

Such electronic wheel units, control devices and systems and methods monitoring wheels implemented therewith are used, in particular, in what are referred to as tire pressure monitoring systems (abbreviated to TPMS).

In known tire pressure monitoring systems, the electronic wheel units which are arranged on the vehicle wheels of the vehicle are each designed to measure, as a wheel operating parameter, at least one tire pressure of the respective vehicle wheel which is formed from a rim and a tire mounted thereon Corresponding wheel operating data telegrams, that is to say containing at least one item of information about the measured tire pressure, are transmitted from time to time by radio to the control device arranged on the vehicle, according to a predefined data transmission protocol.

The reception and evaluation of the wheel operating data telegrams at the control device requires each electronic wheel unit to use, for the transmission of the wheel operating data telegrams, the data transmission protocol which is suitable for the control device.

Since various vehicle manufacturers and various types of vehicle typically require a manufacturer-specific or vehicle-type specific data transmission protocol corresponding to the control device installed in the vehicle, the problem arises for the spare part business that when one or more electronic wheel units are replaced it is necessary to keep in stock a large number of different variants of the electronic wheel unit (corresponding to the various data transmission protocols) in order to be able to supply in an individual case the respectively suitable variant and mount it on a respective vehicle wheel.

Alternatively or additionally to keeping a large number of different variants of an electronic wheel unit in stock, it is possible to provide an electronic wheel unit with a data protocol which can be adapted in an individual case. However, in this case there is still considerable expenditure in terms of time and logistics on the specific execution of such an adaptation. This also requires complex and/or expensive equipment for a workshop, e.g. specific devices for reprogramming or newly programming electronic wheel units.

SUMMARY OF THE INVENTION

It is therefore an object of the present invention to avoid the problems described above and to permit, in particular, wheel-monitoring systems and method for monitoring wheels which permit electronic wheel units to be used more widely and conveniently.

A first aspect of the invention relates to an electronic wheel unit for a wheel-monitoring system of a vehicle which is equipped with vehicle wheels, wherein the electronic wheel unit is designed to detect, while being arranged on one of the vehicle wheels, at least one wheel operating parameter of the vehicle wheel and to transmit wheel operating data telegrams by radio to a control device of the vehicle according to a data transmission protocol, which control device is designed to receive and evaluate the wheel operating data telegrams. The electronic wheel unit is also designed to define the data transmission protocol, to be used to transmit the wheel operating data telegrams, on the basis of data, referred to below a specification data, which have previously been transferred from the control device of the vehicle to the electronic wheel unit, in particular from the control device of the vehicle to the electronic wheel unit in a wireless fashion.

With such an electronic wheel unit it is advantageously possible to adapt automatically the data transmission protocol which is used to transmit the wheel operating data telegrams.

A second aspect of the invention relates to a control device for a wheel-monitoring system of a vehicle which is equipped with vehicle wheels, wherein at least one of the vehicle wheels is equipped with an electronic wheel unit, arranged thereon, for detecting at least one wheel operating parameter of the respective vehicle wheel and for transmitting wheel operating data telegrams by radio to the control device according to data transmission protocol, wherein the control device is designed to receive and evaluate the wheel operating data telegrams. The control device is also designed to transfer specification data to the electronic wheel unit, on the basis of which specification data it is possible to enable the electronic control unit to define the data transmission protocol to be used to transmit the wheel operating data telegrams. In particular, the control unit can be designed to transfer the specification data to the electronic wheel unit in a wireless fashion.

With such a control device, an electronic wheel unit contained in the respective wheel-monitoring system can be enabled to perform automatic adaptation of the data transmission protocol used for transmitting, said adaptation being able to be simplified further.

A further aspect to the invention relates to a wheel-monitoring system for a vehicle which is equipped with vehicle wheels and which has at least one electronic wheel unit of the type specified above or below and/or a control device of the type specified above or below.

A further aspect of the invention relates to a method for monitoring wheels in a vehicle equipped with vehicle wheels, wherein on at least one of the vehicle wheels at least one wheel operating parameter of the vehicle wheel is detected by means of an electronic wheel unit arranged on the vehicle wheel and wheel operating data telegrams are transmitted by radio by means of the electronic wheel unit to a control device of the vehicle according to a data transmission protocol, which control device is designed to receive and evaluate the wheel operating data telegrams, wherein in the electronic wheel unit the data transmission protocol which is used to transmit the wheel operating data telegrams is defined on the basis of specification data which have previously been transferred from the control device of the vehicle to the electronic wheel unit, in particular in a wireless fashion.

A further aspect to the invention relates to a computer program product having a program code which, when executed on a data processing device (e.g. a data processing device of the electronic wheel unit and/or of the control device), carries out a method for monitoring wheels of the type specified above or below.

The electronic wheel unit can be e.g. battery-operated and can be arranged, e.g. in the case of a vehicle wheel formed from a rim and a tire mounted thereon, on the rim or on the tire, e.g. on an inner side of a tread surface of the tire. The wheel unit can also be arranged e.g. on the internal end of an (air) valve stem.

The electronic wheel unit can have, for detecting the at least one wheel operating parameter, at least one sensor for measuring the wheel operating parameter or parameters.

The electronic wheel unit preferably has a program-controlled computing unit with an assigned memory unit, e.g. in order to subject sensor signals of one or more sensors to further processing and/or evaluation, and in order to generate the wheel operating data telegrams to be transmitted. A program code which controls the operation of the computing unit and also further data items can be stored in the memory unit.

Further data items which are stored in the memory unit of the electronic wheel unit can contain, in particular, wheel data. These can be understood to be quite generally physical properties (e.g. rim dimensions and/or tire dimensions such as rim diameter or tire diameter etc.) which can be measured at the respective vehicle wheel as well as other properties (e.g. manufacturer, tire type, tire DOT code, etc.) of the respective vehicle wheel, which depend essentially only on the quality of the wheel itself and/or do not depend directly on the current operation of the vehicle wheel.

The wheel data can be stored, e.g. by workshop personnel within the scope of a wheel change or tire change, in the respective electronic wheel unit or in the respective electronic wheel units.

Finally, the electronic wheel unit has a radio transmitter unit for transmitting the wheel operating data telegrams.

In one embodiment, the electronic wheel unit has a radio receiver unit for receiving specification data transmitted by radio.

The radio receiver unit of the electronic wheel unit can be embodied in structural combination here with the radio transmitter unit of the electronic wheel unit as a radio transceiver unit of the electronic wheel unit. Therefore, e.g. a bidirectional radio data link can be implemented between the electronic wheel unit and the control device.

In one embodiment of the electronic wheel unit there is provision that the specification data contain setting parameters and the electronic wheel unit is designed to set the data transmission protocol to be used, according to the setting parameters.

In this case, a data transmission protocol which is to be used for transmission is already roughly defined in the electronic wheel unit, but can still be adjusted with respect to predetermined protocol details. The specific setting can be performed on the basis of the transferred setting process.

In one embodiment there is provision that the specification data contain a program code, and the electronic wheel unit is designed to make the program code run in order to control generation of the wheel operating data telegrams.

In this case it is unnecessary for a data transmission protocol to be defined in advance in the electronic wheel unit, since the transferred program code can define such a data transmission protocol and can constitute, in particular, e.g. a complete algorithm for generating the wheel operating data telegram according to this data transmission protocol.

In one embodiment there is provision that the specification data contain an identification of the control device and/or of the vehicle, and the electronic wheel unit is designed to select the data transmission protocol to be used from a multiplicity of data transmission protocols stored in advance in the electronic unit, according to the identification.

In this case a plurality of data transmission protocols which are stored in advance in the electronic wheel unit are each stored with an assigned identification of a control device (or of a control device type) and/or a vehicle (or of a vehicle type). On the basis of the transferred identification, the electronic wheel unit can therefore select a data transmission protocol which is suitable in the specific case. Specifically in this context, the term data transmission protocol (stored in advance) is to be understood as meaning that each such data transmission protocol can be represented, if appropriate, e.g. only by setting parameters and/or program code of the type already explained.

Regarding the three possible contents of the specification data (setting parameters, program code, identification) explained above, any desired combinations are also possible, i.e. embodiments in which, for the definition of the data transmission protocol, the electronic wheel unit is not dependent on precisely one of the specified contents but rather is designed to use two or even all three of these contents.

In one embodiment, the electronic wheel unit is also designed to transmit an identification code, identifying the electronic wheel unit, to the control device of the vehicle, preferably as a data component of the wheel operating data telegram transmitted by the electronic wheel unit. On the basis of this identification code, the control device can advantageously make, within the scope of the evaluation, an assignment of the received wheel operating data to a respective installation position of the respective vehicle wheel, which can also be referred to as a location determination or location determining method.

Within the scope of the present invention it is conceivable that such an identification code, transmitted by the electronic wheel unit to the control device, is interpreted by the control device as a request to transfer the specification data and/or for a definition of the specific type of the specification data to be transferred.

As an alternative or in addition to transmitting an identification code from the electronic wheel unit to the control device, it is also possible that a request signal which is predetermined specifically as a request to transfer specification data is transmitted to the control device, in response to which said control device transfers the specification data. Such a request signal can, for appropriate, also define a type of specification data which is desired or requested by the electronic wheel unit.

In the above-mentioned embodiments, the electronic wheel unit is therefore designed to transmit to the control device a request signal as a request to transfer the specification data. The request signal can contain here, as already explained, the identification code and/or be embodied as a predetermined request signal.

The control device according to the invention preferably has a program-controlled computer unit together with an assigned memory unit. A program code which controls the operation of the computer unit and also further data items, such as in particular e.g. the specification data to be transmitted, can be stored in the memory unit.

In one development, the control device is designed to obtain the specification data at least partially, i.e. entirely or partially, from an external data server, i.e. a vehicle-external data server (e.g. via an Internet connection of the vehicle, which connection is implemented by means of a mobile radio device of the vehicle).

For receiving the wheel operating data telegrams, the control device can have a radio receiver unit which, when there are a plurality of electronic wheel units installed on the respective vehicle, can receive the wheel operating data telegrams of all the electronic wheel units.

In one embodiment of the control device according to the invention, said control device has a radio transmitter unit for transmitting the specification data by radio to the electronic wheel unit or to the electronic wheel units.

The radio transmitter unit of the control device can be embodied in structural combination here with the radio receiver unit of the control unit as a radio transceiver unit of the control unit. Therefore, e.g. a bidirectional radio data link can be implemented between the control device and the electronic wheel unit.

In one embodiment of the control device according to the invention there is provision that the specification data contain setting parameters for enabling the electronic wheel unit to set the data transmission protocol to be used, according to the setting parameters.

In this case, e.g. permanently predefined setting parameters can be provided which have been agreed e.g. between manufacturers of vehicles and/or control devices and manufacturers of electronic wheel units.

In one embodiment there is provision that the specification data contain a program code for enabling the electronic wheel unit to make the program code run in order to control generation of the wheel operating data telegrams.

In this case, there is a particularly large variation range, which concerns the specific definition of the data transmission protocol which occurs in the electronic wheel unit.

In one embodiment there is provision that the specification data contain an identification of the control device and/or of the vehicle, in order to enable the electronic wheel unit to select the data transmission protocol to be used from a multiplicity of data transmission protocols stored in advance in the electronic unit, according to the identification.

In this case, an identification of the control device or of the vehicle can relate e.g. to a type (a model) of the control device or of the vehicle and therefore does not have to constitute a uniquely defined identification of the control device or of the vehicle.

With regard to the three possible contents of the specification data (setting parameters, program code, identification) mentioned above, it is also possible to implement embodiments of the control device in which such contents are combined, thus the control device is able to transfer specification data which have two or even all three of the above-mentioned contents at the same time (e.g. as a function of a request, output previously by the electronic wheel unit, to transfer specification data).

In one embodiment, the control device is also designed to use an identification code, which is transmitted from the electronic wheel unit to the control device by means of the wheel operating data telegrams and which identifies the electronic wheel unit, to make, on the basis of this identification code, an assignment of the individual received wheel operating data telegrams or of the wheel operating data contained therein to a respective installation position of the respective vehicle wheel (location determination).

Alternatively or additionally, the control device can be designed to interpret such an identification code of the electronic wheel unit as a request to transfer the specification data and/or for a definition of the specific type of the specification data to be transferred.

In this case, the specification data can advantageously be adapted to the type of the electronic wheel units which are actually installed on the vehicle. For this purpose, the control device can be designed to adapt the specification data to a type of the electronic wheel unit. The control device can be designed here, in particular, to adapt the specification data to the type of electronic wheel unit in response to the request signal transmitted by the electronic wheel unit.

In this context, in particular, e.g. acceptance or non-acceptance of each of the three contents (setting parameters, program code, identification) already explained above can be provided as a function of the received identification codes of the electronic wheel unit. Alternatively or additionally, setting parameters to be transferred and/or a program code to be transferred can also be adapted as a function of the received identification code of the electronic wheel unit (e.g. in the event of different wheel unit types requiring or expecting different setting parameters or different program code).

As an alternative or in addition to this use of the identification code of the electronic wheel unit, it is also possible that a request signal which is predetermined specifically as a request to transfer specification data is transmitted to the control device, in response to which said control device transfers the specification data. Such a request signal can, if appropriate, also define a type of specification data which is desired or requested by the electronic wheel unit.

In the above-mentioned embodiments, the control device is therefore designed to transmit the specification data to the electronic wheel unit in response to a request signal which is transmitted by the electronic wheel unit. The request signal can contain here, as already explained, the identification code and/or be embodied as a predetermined request signal.

A wheel-monitoring system which is equipped with at least one electronic wheel unit of the type described here and/or one control device of the type described here can possess, in particular, at least the functionality of tire-pressure monitoring and therefore constitute, in particular, a tire pressure-monitoring system (TPMS).

As an alternative to or in addition to the detection of the tire pressure at the respective vehicle wheel, within the scope of the invention other wheel operating parameters of the vehicle wheel can however also be detected and used to generate the corresponding wheel operating data telegrams, such as e.g. a tire temperature and/or an acceleration at the location where the electronic wheel unit is arranged.

By means of the detection of an acceleration, in particular e.g. a radial acceleration, an instantaneous rotational speed and/or an instantaneous rotational position of the respective vehicle wheel can also be advantageously determined by corresponding evaluation of the sensor signal. The rotational speed and/or the rotational position can then be taken into account e.g. as further detected wheel operating parameters during the formation of the wheel operating data telegrams.

The term "wheel operating parameters" comprises generally any physical variable (e.g. tire pressure, tire temperature, rotational speed etc.) which can be measured at the respective vehicle wheel and can be changed in accordance with a driving operation.

The "wheel operating data telegrams" according to the present application contain information about the respective wheel operating parameter or parameters (e.g. tire pressure measured values, tire temperature measured values, rotational speed measured values etc.) and/or about at least one variable derived therefrom, such as e.g. a tire pressure which is corrected to a predefined temperature.

In addition to the transmission of such information relating to the wheel operation to the control device, it is also possible to provide for the above-mentioned wheel data to be transferred to the control device by means of the wheel operating data telegrams. Moreover, wheel data can be transferred from the control device to the electronic wheel units by means of the radio transmitter and receiver units of the electronic wheel units and the control device.

The invention can be used, in particular, for monitoring wheels in motor vehicles such as e.g. passenger cars and trucks.

The term "data transmission protocol" relates according to the present application to any transmission details or transmission parameters of the wheel operating data telegrams which are transmitted by radio, for example a carrier frequency (or a radio channel etc.) of the radio signal to be transmitted, a modulation type of the data modulation, chronological parameters relating to e.g. chronological intervals within or between successive radio signals and parameters or predefinitions relating to the structuring and/or presentation of the data within the individual wheel operating data telegrams (e.g. a header, a data format etc.).

The specification data can be transferred from the control device to the electronic wheel unit, in particular, e.g. by radio, for example via a bidirectional radio data connection between the control device and the electronic wheel unit, which radio data link is also used to transmit the wheel operating data telegrams.

Alternatively, it is possible to transfer the specification data via a further radio link which can be used specifically for this purpose, for example in that both the electronic wheel unit and the vehicle-side control device are equipped with a suitable functionality (e.g. Bluetooth, particular Bluetooth Low Energy (BLE), WiFi or the like).

In addition, it is also possible to transfer the specification data in any other desired suitable wireless fashion. An example of this is transfer within the scope of a configuration (training) of the electronic wheel unit, in which the latter is moved into the proximity of a vehicle device which is suitable for data communication. This device can be e.g. a charging station for inductively charging mobile devices. Alternatively, another suitable NFC (Near Field Communication) range of the vehicle can also be provided or can be used for this.

BRIEF DESCRIPTION OF THE SEVERAL VIEWS OF THE DRAWING

The invention is described in more detail below on the basis of exemplary embodiments with reference to the enclosed drawings, Of the said figures.

DESCRIPTION OF THE INVENTION

Figure 1:
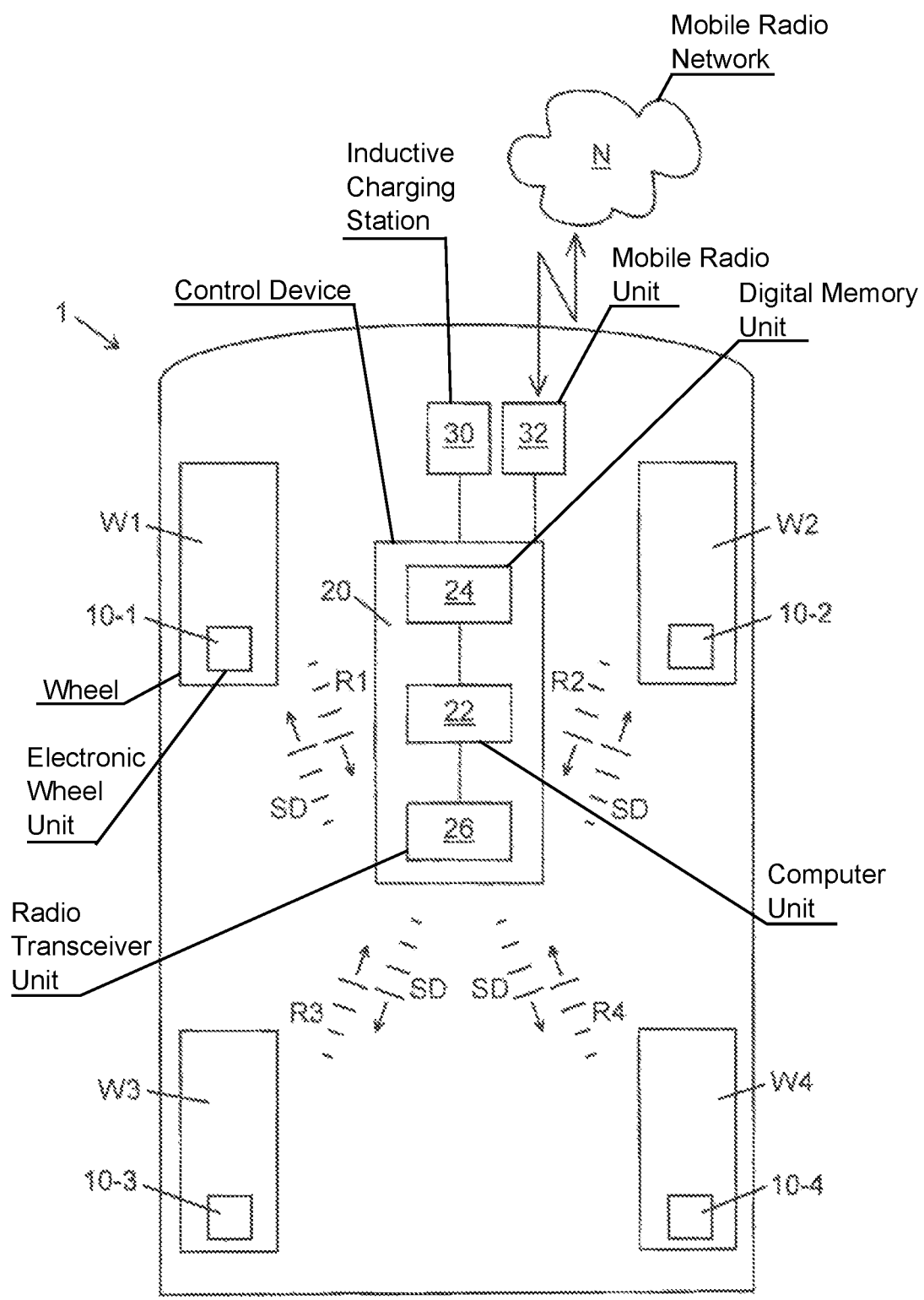
FIG. 1 shows a schematic plan view of a vehicle according to one exemplary embodiment, which is equipped with a wheel-monitoring system.

FIG. 1 shows a vehicle 1, here for example a four-wheel passenger car with vehicle wheels W1-W4.

Each of the vehicle wheels W1-W4 is equipped with an electronic wheel unit 10-1,10-2,10-3 or 10-4, arranged thereon, for detecting at least one wheel operating parameter of the respective vehicle wheel W1, W2, W3 or W4 and for transmitting associated wheel operating data telegrams R1, R2, R3 or R4.

The transmission of the wheel operating data telegrams R1 to R4 is carried out according to a data transmission protocol by radio to a control device 20 of the vehicle 1.

In the illustrated example, a tire pressure-monitoring system (TPMS) of the vehicle 1 is made available using the electronic wheel units 10-1 to 10-4.

Accordingly, in the embodiment shown, the electronic wheel units 10-1 to 10-4 detect in each case at least the tire pressure of the respective vehicle wheel of the vehicle wheels W1 to W4, wherein the vehicle wheels W1 to W4 in this example are each formed by a rim with an air-filled tire mounted thereon, and the electronic wheel units 10-1 to 10-4 transmit wheel operating data containing at least one item of information about the tire pressure to the control device 20 of the vehicle 1. Further wheel operating parameters which are to be detected and from which a corresponding item of information can be incorporated into the transmitted wheel operating data can be e.g. in particular a temperature measured at the respective tire or else e.g. a wheel rotational position and/or a wheel rotational speed.

The electronic wheel units 10-1 to 10-4 have, in the embodiment shown, an identical design and can be arranged e.g. on an inner side of a tire tread surface of the respective tire.

Figure 2:
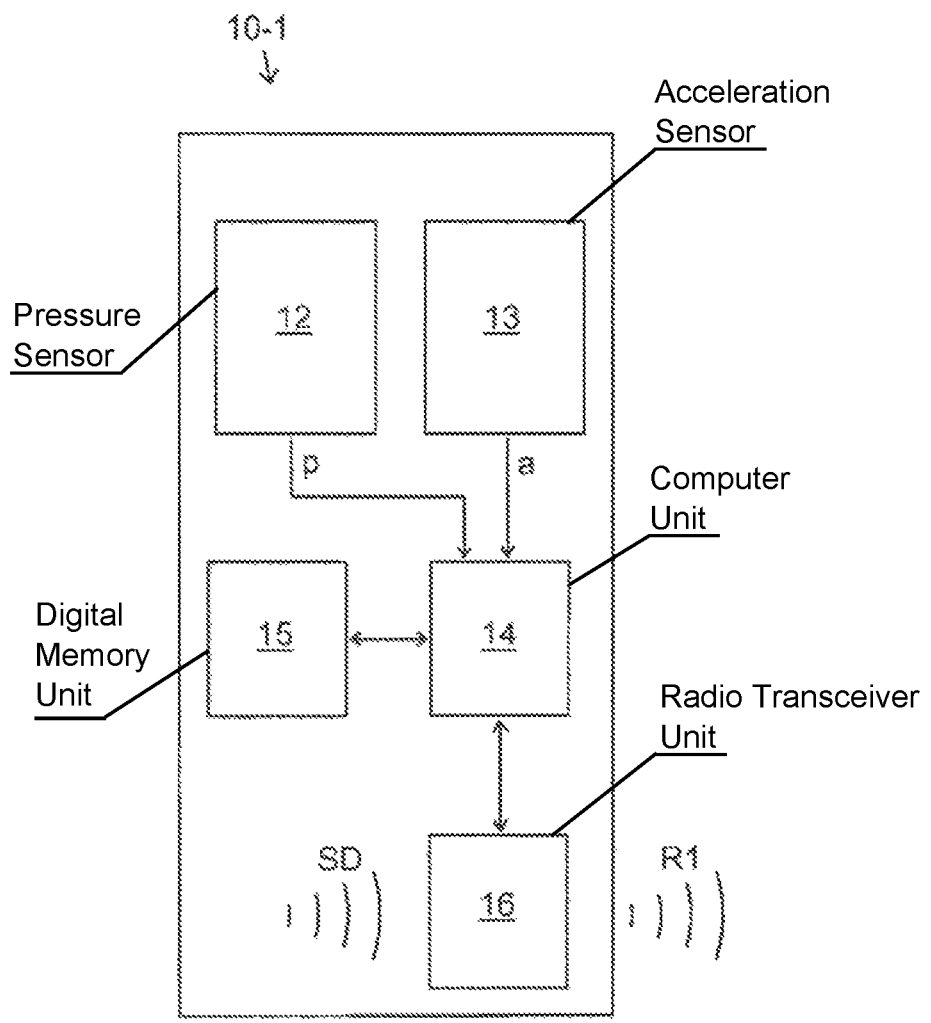
FIG. 2 shows a block circuit diagram of an electronic wheel unit used in the wheel-monitoring system in FIG. 1.

Referring to FIG. 2, which shows by way of example the design of the electronic wheel unit 10-1, each of the wheel units has a pressure sensor 12 for measuring the tire pressure and for making available a pressure sensor signal "p" representing the tire pressure and an acceleration sensor 13 for measuring a radial acceleration (at the location where the electronic wheel unit 10-1 is mounted) and for making available an acceleration sensor signal "a" which represents this radial acceleration.

The sensor signals, i.e. the pressure sensor signal "p" and the acceleration sensor signal "a" are, as illustrated, fed for processing to a program-controlled computer unit 14 of the electronic wheel unit 10-1, the operation of which is controlled by a program code stored in an assigned digital memory unit 15.

The computer unit 14 generates the wheel operating data which are to be transmitted in the form of the wheel operating data telegrams R1 by radio and which are transmitted from time to time to the vehicle-side control device 20 (FIG. 1).

The electronic wheel unit 10-1 is equipped for this purpose with a radio transceiver unit 16 with which the radio signals and/or wheel operating data telegrams R1 are transmitted.

The control device 20 is, as illustrated in FIG. 1, equipped with a radio transceiver unit 26 with which the wheel operating data telegrams R1 to R4 of all the electronic wheel units 10-1 to 10-4 are received and fed for evaluation to a program-controlled computer unit 22 of the control device 20.

The measurement of the radial acceleration and provision of the corresponding acceleration sensor signal "a" serves in the illustrated example to acquire, on the basis of an evaluation of the sensor signal profile, values of an instantaneous wheel rotational speed and/or of a wheel rotational position of the respective vehicle wheel W1 and to incorporate corresponding information on this into the wheel operating data telegrams R1. Even though not illustrated in FIG. 2, the electronic wheel unit 10-1 can also have e.g. a temperature sensor for measuring a tire temperature and for making available a sensor signal representing this temperature.

Returning to FIG. 1, the vehicle-side control device 20 has, as already explained, the program-controlled computer unit 22 for evaluating the wheel operating data contained in the wheel operating data telegrams R1 to R4, wherein the operation of the computer unit 22 is controlled by a program code stored in an assigned digital memory unit 24.

The electronic wheel units 10-1 to 10-4 form in the illustrated example, in conjunction with the control device 20, a wheel-monitoring system of the vehicle 1, in which, inter alia, the respective tire pressure is measured in each case at each of the vehicle wheels W1 to W4, and information about this is transmitted to the control device 20 of the vehicle 1 by means of the respective wheel operating data telegrams R1 to R4.

In the case of a loss of tire pressure being detected at one of the vehicle wheels W1 to W4 by the control device 20 on the basis of the received tire pressure data, a corresponding abnormality message, in particular e.g. a warning to the driver of the vehicle 1 (e.g. via a man/machine interface of the vehicle 1) can be made available by the control device 20.

A particularity of the electronic wheel unit 10-1 (and correspondingly also of the further wheel units 10-2 to 10-4) is that it is designed to define the data transmission protocol, to be used to transmit the wheel operational data telegrams R1 on the basis of specification data SD which, in the embodiment shown, have been previously transferred from the control device 20 of the vehicle 1 to the electronic wheel unit 10-1 in a wireless fashion.

In the illustrated example, the reception of specification data SD transmitted by radio takes place by means of the radio transceiver unit 16 of the electronic wheel unit 10-1.

The data transmission protocol to be used to transmit the wheel operating data telegrams R1 is defined in a program-controlled fashion by the computer unit 14 on the basis of the specification data SD passed on from the radio transceiver unit 16 to the computer unit 14.

In the illustrated example, the definition of the data transmission protocol, that is to say the definition of the specific way in which the wheel operating data in the individual wheel operating data telegrams R1 are presented and structured (and if appropriate the definition of specific technical radio parameters of the radio signals), is controlled by software which is stored in the memory unit 15. In this context, in particular one or more of the following functionalities can be implemented:

For example, there can be provision that the electronic wheel unit 10-1 detects setting parameters contained in the specification data SD as such and sets a data transmission protocol, already basically defined by the software, in terms of fine adjustment according to the received setting parameters.

Alternatively or additionally there can be provision that the electronic wheel unit 10-1 detects a program code in the specification data SD and makes this program code run on the computer unit specifically in order to control the generation of the wheel operating data telegrams R1.

Finally, there can alternatively or additionally be provision that the electronic wheel unit 10-1 detects an identification, contained in the specification data SD, of the control device 20 and/or of the vehicle 1 and in accordance with this identification selects the data transmission protocol to be used from a multiplicity of data transmission protocols stored in advance in the electronic wheel unit 10-1 or in the memory unit 15 of the electronic wheel unit 10-1.

The identification here can uniquely characterize e.g. a specific type (model, version number etc.) of the control device 20 or a specific type of the vehicle 1 (manufacturer, model series, year of manufacture etc.)

The selection can be made for example as a calling of the data transmission protocol (or of data necessary to define the same) from a lookup table stored in advance in the memory unit 15.

In the illustrated example, the control device 20 is designed to transmit the specification data SD to the electronic wheel unit 10-1 to 10-4 by means of the radio transceiver unit 26, as illustrated in FIG. 1.

There are various possibilities regarding the time of transfer of the specification data SD.

For example, this can occur from time to time, for instance at regular time intervals. In this context it is also possible to provide variation of the time intervals as a function of specific circumstances, for instance clustered transmission immediately after the activation of the control device 20 and/or after the start of a driving operation of the vehicle 1.

Moreover, it is conceivable that a user can trigger, e.g. via a man/machine interface of the vehicle 1, emission of the specification data SD by means of the control device 20.

In this way, e.g. workshop personnel can initiate training of the new electronic wheel unit with respect to the data transmission protocol to be used, after the replacement of an electronic wheel unit (e.g. within the scope of a tire change or wheel change).

As an alternative to or in addition to transmission of the specification data SD being provided from time to time, it is also possible to provide that a request signal, which is specifically predetermined or defined in advance as a request to transfer the specification data SD, is transmitted in e.g. a wireless fashion to the control device 20, in response to which the control device 20 transfers the specification data SD.

If, as is provided in the illustrated example, a bidirectional radio data link is present between the control device 20 and each of the electronic wheel units 10-1 to 10-4, a request can also advantageously be transferred to the control device 20 via this link.

As an alternative to or in addition to a possibility of transferring the request by radio, whether by using the radio transceiver units 16 and 26 or by means of close-range communication devices provided separately therefrom (e.g. according to the Bluetooth standard or WiFi standard or the like), the transfer could also be effected e.g. by means of a vehicle-side charging station for inductively charging mobile devices.

FIG. 1 shows byway of example such an inductive charging station 30 with the additional functionality of a data transmission which can be used e.g. by workshop personnel to train an electronic wheel unit by moving the electronic wheel unit into the effective range of the inductive charging station 30, in order thereby to transfer a request to transfer the specification data SD to the control device 20.

As an alternative to or in addition to emitting the specification data SD by means of the radio transceiver unit 26, in this case is also possible to transfer the specification data SD to the electronic wheel unit via the inductive charging station 30.

The specification data SD transferred from the control device 20 can contain, in particular, one or more of the contents (setting parameters, program code, identification) which have already been explained above.

Moreover, by means of the radio transceiver units 16 and 26 and/or the inductive charging station 30 and/or other close-range communication devices it is possible to transfer wheel data from the electronic wheel units 10-1 to 10-4 to the control device 20 and/or from the control device 20 to the electronic wheel units 10-1 to 10-4. The wheel data can contain here e.g. rim dimensions and/or tire dimensions such as rim diameters or tire diameters as well as other properties (e.g. manufacturer, tire type, tire DOT code etc.) of the respective vehicle wheel W1-W4.

Figure 3:
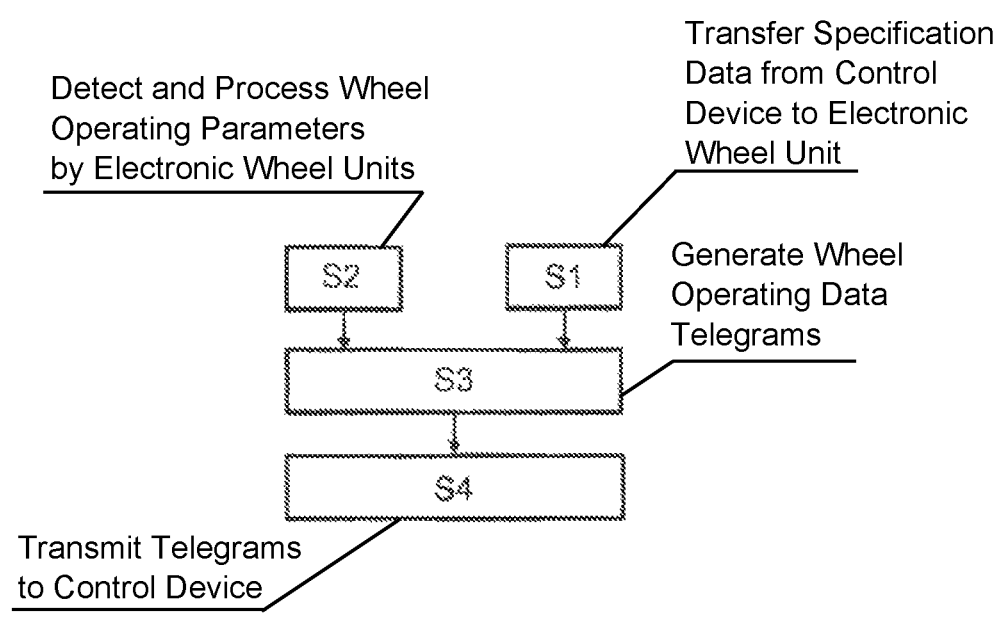
FIG. 3 shows a flowchart illustrating a method for monitoring wheels carried out with the wheel-monitoring system in FIG. 1.

FIG. 3 illustrates a method, carried out with the described wheel-monitoring system, for monitoring wheels in its essential steps.

In a step S1 specification data SD are transferred from the control device 20 to the electronic wheel units 10-1 to 10-4, and in a step S2 wheel operating parameters of the respective vehicle wheel are respectively detected and processed further by the electronic wheel units 10-1 to 10-4 (if appropriate step S1 can also be triggered by a corresponding request, as has already been explained).

In a step S3 wheel operating data telegrams R1, R2, R3 and R4 are respectively generated by the electronic wheel unit 10-1 to 10-4 and are each transmitted to the control device 20 at specific time intervals in a step S4 by means of the respective transceiver unit 26.

In one development of this method and of the wheel-monitoring system described above, the control device 20 is equipped with or connected to a mobile radio unit for enabling a data communication between the control device 20 and an external device such as e.g. an Internet server.

FIG. 1 illustrates by way of example such a mobile radio unit 32 which implements an Internet access of the vehicle 1 by means of a mobile radio network N.

This development possesses, in particular, the following two advantages within the scope of the invention: On the one hand, the control device 20 is therefore enabled to obtain the necessary specification data SD partially or completely from the specified external device (e.g. an Internet data server), which makes it possible to dispense with corresponding storage of such data or data parts in the vehicle 1. The corresponding data can be requested e.g. by the control device 20 (if appropriate by transferring an identification of the control device 20 or of the vehicle 1) from the external device. On the other hand, the mobile radio unit 32 can advantageously be used in the case in which an electronic wheel unit transmits a request to transfer specification data SD to the control device 20, and in this context transfers, as part of the request or separately therefrom, an identification code of this electronic wheel unit to the control device 20. In this case, the request can be passed on to the external device by means of the mobile radio communication, in response to which the requested specification data SD, which are adapted to the electronic wheel unit, are transferred by means of the mobile radio communication to the control device 20, from which the specification data SD are transferred onto the electronic wheel unit.

LIST OF REFERENCE DESIGNATIONS

1 Vehicle
W1 to W4 Vehicle wheels
10-1 to 10-4 Electronic wheel units
R1 to R4 Wheel operating data telegrams
12 Pressure sensor
p Pressure sensor signal
13 Acceleration sensor
a Acceleration sensor signal
14 Computer unit
15 Memory unit
16 Radio transceiver unit
20 Control device
22 Computer unit
24 Memory unit
26 Radio transceiver unit
SD Specification data
30 Inductive charging station
32 Mobile radio unit
N Mobile media network
S1 Step
S2 Step
S3 Step
S4 Step

The invention claimed is:

1. In a wheel-monitoring system for a vehicle equipped with vehicle wheels and a control device, the improvement comprising:
   an electronic wheel unit configured to detect, while being disposed on one of the vehicle wheels, at least one wheel operating parameter of the vehicle wheel and to transmit wheel operating data telegrams wirelessly to the control device of the vehicle according to a data transmission protocol, the control device being configured to receive and evaluate the wheel operating data telegrams; and
   the electronic wheel unit being configured to define the data transmission protocol to be used to transmit the wheel operating data telegrams based on specification data having previously been transferred from the control device of the vehicle to said electronic wheel unit.

2. The electronic wheel unit according to claim 1, which further comprises a receiver unit for receiving the specification data transmitted wirelessly.

3. The electronic wheel unit according to claim 1, wherein the specification data contain setting parameters, and the electronic wheel unit is configured to set the data transmission protocol to be used according to the setting parameters.

4. The electronic wheel unit according to claim 1, wherein the specification data contain a program code, and the electronic wheel unit is configured to make the program code run in order to control a generation of the wheel operating data telegrams.

5. The electronic wheel unit according to claim 1, wherein the specification data contain an identification of at least one of the control device or the vehicle, and the electronic wheel unit is configured to select the data transmission protocol to be used from a multiplicity of data transmission protocols, stored in said electronic wheel unit, according to the identification.

6. The electronic wheel unit according to claim 1, wherein the electronic wheel unit is configured to transmit, to the control device, a request signal as a request to transfer the specification data.

7. The improvement according to claim 1, wherein the electronic wheel unit is part of the wheel monitoring system.

8. In a vehicle equipped with a wheel-monitoring system and vehicle wheels, at least one of the vehicle wheels having an electronic wheel unit disposed thereon for detecting at least one wheel operating parameter of the respective vehicle wheel and for transmitting wheel operating data telegrams wirelessly according to a data transmission protocol, the improvement comprising:
   a control device for the wheel-monitoring system, the control device being configured to receive and evaluate the wheel operating data telegrams; and
   the control device being configured to transfer specification data to the electronic wheel unit for enabling the electronic wheel unit to define the data transmission protocol to be used to transmit the wheel operating data telegrams based on the specification data.

9. The control device according to claim 8, wherein the control device is configured to obtain the specification data at least partially from an external data server.

10. The control device according to claim 8, which further comprises a transmitter unit for transmitting the specification data wirelessly to the electronic wheel unit.

11. The control device according to claim 8, wherein the specification data contain setting parameters for enabling the electronic wheel unit to set the data transmission protocol to be used, according to the setting parameters.

12. The control device according to claim 8, wherein the specification data contain a program code for enabling the electronic wheel unit to make the program code run in order to control a generation of the wheel operating data telegrams.

13. The control device according to claim 8, wherein the specification data contain an identification of at least one of the control device or the vehicle, in order to enable the electronic wheel unit to select the data transmission protocol to be used from a multiplicity of data transmission protocols, stored in the electronic wheel unit, according to the identification.

14. The control device according to claim 8, wherein the control device is configured to transmit the specification data to the electronic wheel unit in response to a request signal transmitted by the electronic wheel unit.

15. The control device according to claim 8, wherein the control device is configured to adapt the specification data to a type of electronic wheel unit.

16. The improvement according to claim 8, wherein the control device is part of the wheel monitoring system.

17. A method for monitoring wheels in a vehicle equipped with vehicle wheels, the method comprising the following steps:
   using an electronic wheel unit disposed on at least one of the vehicle wheels to detect at least one wheel operating parameter of the vehicle wheel;
   using the electronic wheel unit to transmit wheel operating data telegrams wirelessly to a control device according to a data transmission protocol;
   using the control device to receive and evaluate the wheel operating data telegrams of the vehicle; and
   in the electronic wheel unit, defining the data transmission protocol used to transmit the wheel operating data telegrams on a basis of specification data having previously been transferred from the control device of the vehicle to the electronic wheel unit.

18. A non-transitory computer-readable program product having a program code stored thereon which, when executed on a data processing device, performs a method for monitoring wheels in a vehicle equipped with vehicle wheels comprising the following steps:
   using an electronic wheel unit disposed on at least one of the vehicle wheels to detect at least one wheel operating parameter of the vehicle wheel;
   using the electronic wheel unit to transmit wheel operating data telegrams wirelessly to a control device according to a data transmission protocol;
   using the control device to receive and evaluate the wheel operating data telegrams of the vehicle; and
   in the electronic wheel unit, defining the data transmission protocol used to transmit the wheel operating data telegrams on a basis of specification data having previously been transferred from the control device of the vehicle to the electronic wheel unit.

* * * * *